UNITED STATES PATENT OFFICE.

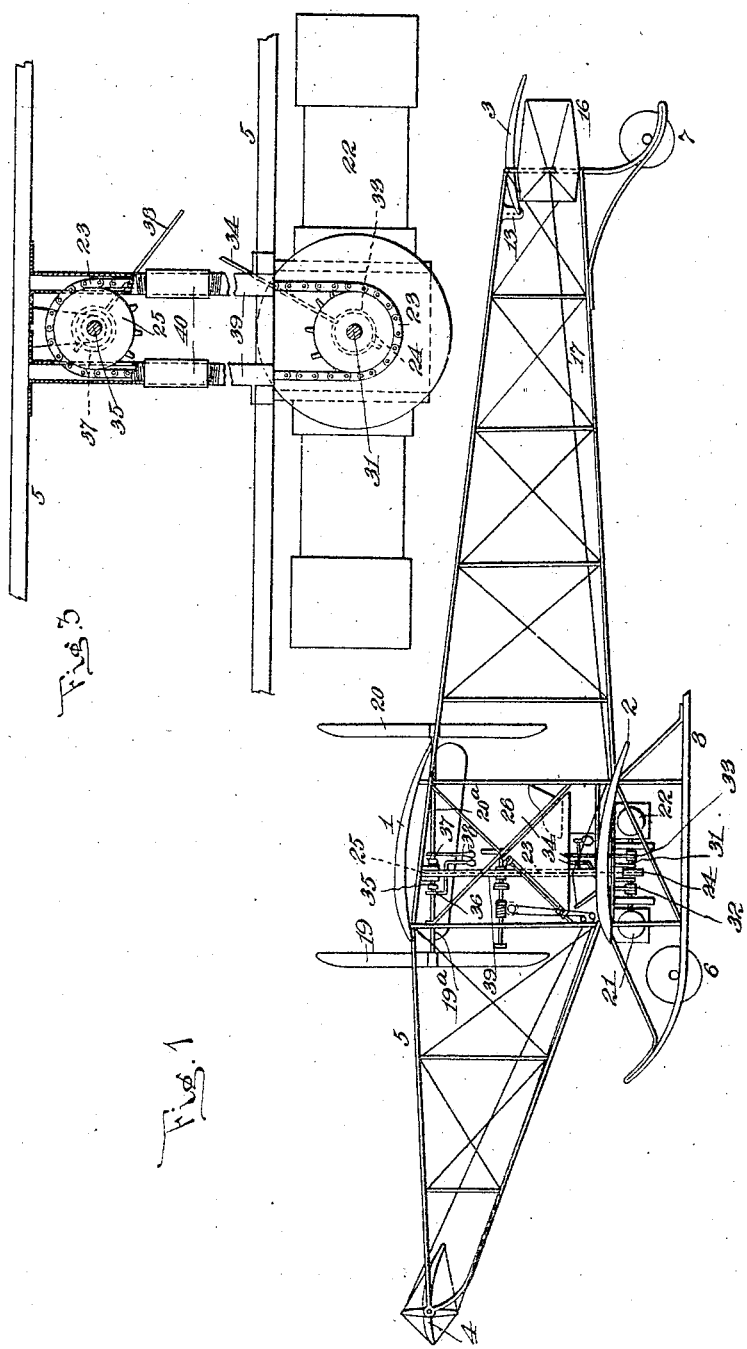

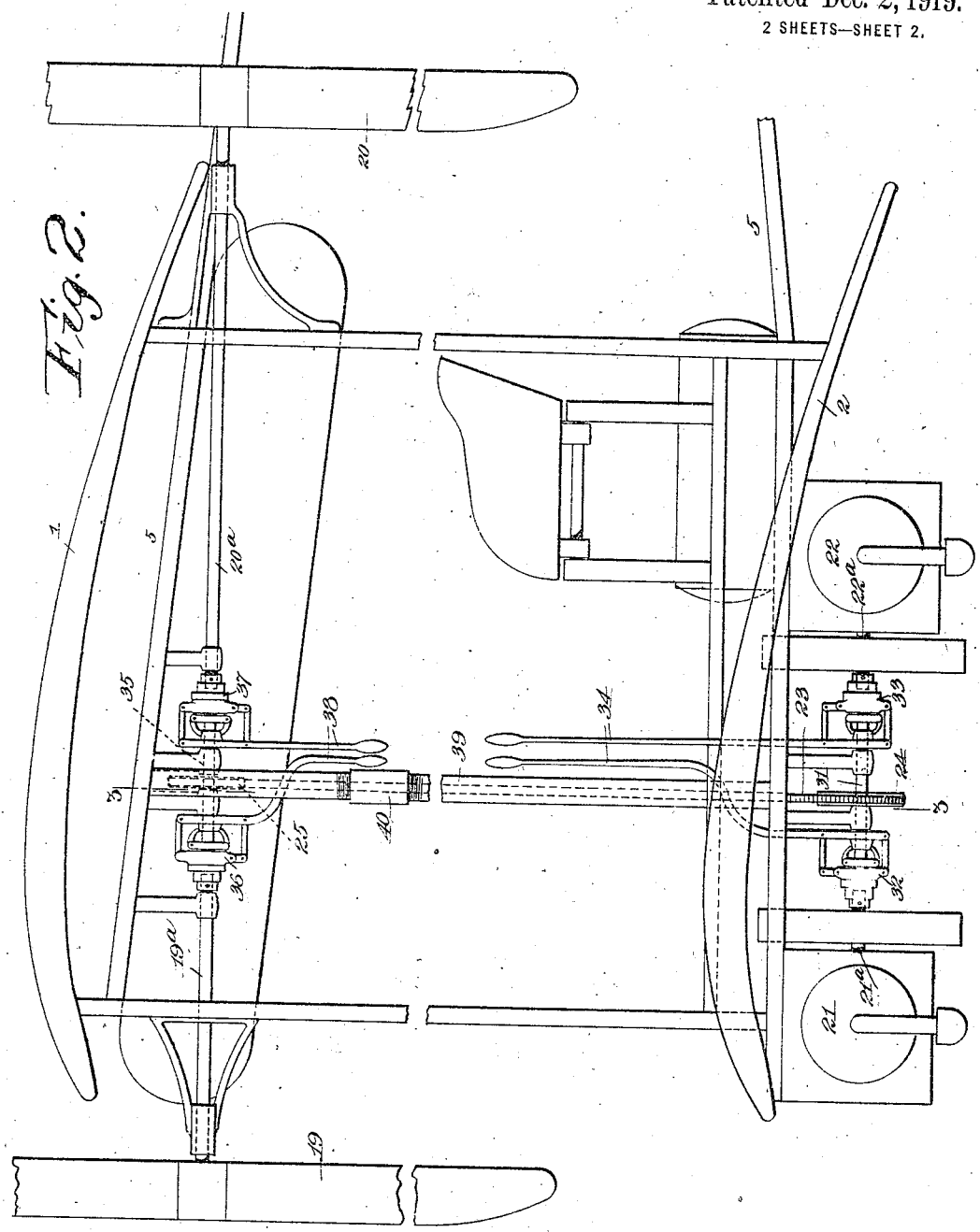

JOHN THOMAS SIMPSON, OF NEWARK, NEW JERSEY.

FLYING-MACHINE.

1,323,321. Specification of Letters Patent. Patented Dec. 2, 1919.

Original application filed July 12, 1910, Serial No. 571,557. Divided and this application filed August 23, 1916. Serial No. 116,518.

*To all whom it may concern:*

Be it known that I, JOHN T. SIMPSON, a citizen of the United States, and residing in Newark, in the county of Essex and State of New Jersey, have invented a certain new and useful Flying-Machine, of which the following is a specification.

This application is a division of an application for patent filed by me July 12, 1910, Serial Number 571,557.

The object I have in view is the production of an aeroplane or heavier-than-air flying machine, which will have advantages in stabilizing, balancing, starting and alighting. Further objects are to produce means by which the motor may be started while the machine is on the ground and to produce means for continuing flight, in the event of a portion of the propelling mechanism ceasing to operate. These and further objects will appear from the following specification and accompanying drawings considered together or separately.

In the drawings,

Figure 1 is the side elevation of an apparatus embodying my invention.

Fig. 2 is a side elevation on an enlarged scale of the centrally located operating and controlling mechanism.

Fig. 3 is a detail section on the line 3—3 of Fig. 2.

In all of the views like parts are designated by the same reference characters.

Certain of my improvements may be used upon an aeroplane of the bi-plane type, and the embodiment chosen for illustration is of this character. I desire to have it understood that the number of planes of the machine is unimportant and that the invention can be carried out with any form of aeroplane.

In the drawings, 1 is the top plane, 2 is the bottom plane, such planes being superposed in the usual manner. 3 is a rear plane for controlling altitude and 4 is a front plane for the same purpose. 5 is the frame. This frame is made of verticals and longitudinals as shown, with diagonal filamentous tension members to secure rigidity. This frame is lightly and rigidly formed. The frame is supported upon front wheels 6 and rear wheel 7. The front wheels are supported upon a sled like arrangement 8 forming skids, there being two of such arrangements in the front. The rear plane 3 is adjustable for different angles of incidence to be determined by trial flights. Adjusting means are shown at 13. This adjusting means for holding the plane at the proper angle of incidence comprises a pillar with a number of openings as illustrated, for the attachment of a pin on the forward edge of the plane, the plane being secured to a horizontal pivot at a point intermediate its ends. The rudder 16 is mounted upon a vertical axis and is controlled by wires 17.

In the preferred embodiment of my invention I employ a front propeller 19 and a rear propeller 20, said propellers being mounted upon suitable shafts $19^a$ and $20^a$ in alinement. I also prefer to utilize a forward engine 21 and a rearward engine 22, having shafts $21^a$ and $22^a$ in alinement. The engines illustrated are of the horizontal, two cylinder, double opposed internal combustion type. The kind of engine may be varied if desired. The shafts of the engines are connected to the shafts of the propeller through suitable sprockets and a chain 23, the sprocket on the line with the engines being indicated by the character 24, and the sprocket on the line with the propellers being indicated by the character 25. The engines, as shown, are below the bottom of the frame so as to make the center of gravity as low as possible and also to allow the operator to be above the engine for safety, while the propellers are arranged adjacent to the top of the frame.

The ailerons 26 are mounted adjacent to the wing tips and are connected to suitable stabilizing mechanism.

I prefer to employ a plurality of motors or engines so that in the event of one of them becoming inoperative, the machine can still remain in flight by utilizing a certain mechanism which I will describe. I also prefer to employ a plurality of propellers for the same purpose, namely, so that if one engine is disconnected one of the propellers may also be disconnected. These propellers I prefer to arrange in alinement one behind the other, so that if one is disconnected the apparatus may be propelled by the other, which would not be possible if two propellers were used upon different vertical planes. The sprocket 24 in alinement with the engines is mounted upon a short shaft 31 in suitable bearings carried by the frame. On each extremity of this shaft is a clutch, the forward clutch being indicated by the character 32 and the rearward clutch by the character 33. It is apparent that by actuating both of these clutches both engines will be connected to the sprocket 24 and that if both are disengaged the sprocket will not be rotated, and the sprocket may be rotated by either one or the other of the engines, which depends upon which clutch is actuated. These clutches are controlled by levers 34—34 within convenient reach of the operator while seated.

The sprocket 25, which is in alinement with the shafts of the propellers, is mounted upon a short shaft 35, the ends of which are provided with a forward clutch 36 and a rear clutch 37, these clutches connecting with the respective forward and rearward propeller shafts 19ª and 20ª. These clutches are controlled by suitable levers 38, also within convenient reach of the operator. It is apparent that both propellers may be rotated by the sprocket 25 when both clutches are engaged and that neither will be rotated if both clutches are disengaged, and one or the other may be rotated, as depends upon whether the forward or rearward clutch is actuated.

By this improved apparatus it is apparent that the engines may be started when the apparatus is on the ground and with both of the lower clutches 32 and 33 disengaged the propellers will remain at rest. After the engines are started and are in rotation, one or both of the propellers may be brought into action and rotated by one or both of the engines by actuating the suitable clutches. It is also apparent that if one or the other engine goes wrong or breaks down, or becomes disabled, that the other engine and propeller can be coupled together, the combinations of arrangements permitting either or both propellers to be operated by either or both engines. As the rear propeller 20 must operate in the air forced backward by the forward propeller 19, it is apparent that the pitch of this propeller should be greater than the pitch of the forward propeller. The pitch of the rear propeller will depend upon the size and speed of the propeller.

The propeller shafts 19ª and 20ª and upper short shaft 35 are mounted in suitable bearings and the bearings on the upper short shaft and the bearings of the lower short shaft are connected together by a pair of radius tubes 39—39, such tubes being provided with adjusting sleeves 40 to secure proper adjustment for the chain. These tubes have openings at the tops and bottoms for the entrance and exit of the chain and therefore provide a protection for the chain and also a protection to the operator.

In accordance with the provisions of the patent statutes I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A flying machine having two propellers in line, the pitch of the propellers being different, propeller shafts in alinement, a center shaft in alinement with the propeller shafts, clutches for the shafts, two engines in line engine, shafts in alinement, a counter shaft in alinement with the engine shafts, clutches connecting the engine and counter shafts, and a chain connecting the center and counter shafts.

2. A flying machine having two engines in axial alinement, a shaft for each engine, a driven shaft in axial alinement with the engine shafts, means for connecting either of the engine shafts with the driven shaft, a counter shaft, two propeller shafts in axial alinement with the counter shaft, a propeller on each shaft, said propellers being of different pitch, means for connecting either of the propellers with the counter shaft, and flexible means for driving the counter shaft from the driven shaft.

3. A flying machine having two engines in axial alinement, a shaft for each engine, a driven shaft in axial alinement with the engine shafts, means for connecting both of the engine shafts with the driven shaft, a countershaft, two propeller shafts in axial alinement with the countershaft, a propeller on each shaft, said propellers being of different pitch, means for connecting both propellers with the countershaft, and flexible means for driving the countershaft from the driven shaft.

4. A flying machine having two engines in axial alinement, a shaft for each engine, a driven shaft in axial alinement with the engine shafts, means for connecting either of the engine shafts with the driven shaft, a countershaft, two propellers in axial alinement with the countershaft, said propellers being of different pitch, means for connecting either of the propellers with the counter shaft, a chain for driving the countershaft from the driven shaft, and a radius rod spacing the shafts apart, said radius rod forming a sheath for the chain.

5. A flying machine having two engines in axial alinement, a shaft for each engine, a driven shaft in axial alinement with the engine shafts, means for connecting either of the engine shafts with the driven shaft, a countershaft, two propellers in axial alinement with the countershaft, said propellers being of different pitch, means for connecting either of the propellers with the countershaft, a chain for driving the countershaft from the driven shaft, and a radius rod spacing the shafts apart, a turnbuckle in the rod, said rod forming an adjustable sheath for the chain.

6. A flying machine having two engines in axial alinement, a shaft for each engine, a driven shaft in axial alinement with the engine shafts, means for connecting both of the engine shafts with the driven shaft, a countershaft, two propellers in axial alinement with the countershaft, said propellers being of different pitch, means for connecting both propellers with the countershaft, a chain for driving the countershaft from the driven shaft, and a pair of adjustable radius rods supporting the shafts and forming a sheath for the chain.

7. A flying machine having two engines in axial alinement, a shaft for each engine, a driven shaft in axial alinement with the engine shafts, means for connecting both of the engine shafts with the driven shaft, a countershaft, two propellers in axial alinement with the countershaft, means for connecting both propellers with the countershaft, a chain for driving the countershaft from the driven shaft, and an adjustable sheath for the chain.

This specification signed and witnessed this 19th day of August, 1916.

JOHN THOMAS SIMPSON.

Witnesses:
  MARIE C. HARTUNG,
  GEORGE ARNOLD WRIGHT.